(12) United States Patent
Liu et al.

(10) Patent No.: US 12,337,884 B2
(45) Date of Patent: Jun. 24, 2025

(54) POSITIONING SYSTEM AND METHOD FOR MAGLEV TRAIN

(71) Applicant: CRRC QINGDAO SIFANG CO., LTD., Shandong (CN)

(72) Inventors: Xiankai Liu, Shandong (CN); Donghua Wu, Shandong (CN); Shanqiang Fu, Shandong (CN); Shi Xiao, Shandong (CN); Kaiyi Tang, Shandong (CN); Zhiqiang Zhang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 18/723,484

(22) PCT Filed: Sep. 28, 2022

(86) PCT No.: PCT/CN2022/121995
§ 371 (c)(1),
(2) Date: Jun. 24, 2024

(87) PCT Pub. No.: WO2023/165124
PCT Pub. Date: Sep. 7, 2023

(65) Prior Publication Data
US 2024/0416978 A1    Dec. 19, 2024

(30) Foreign Application Priority Data
Mar. 4, 2022    (CN) .......................... 202210212795.7

(51) Int. Cl.
*B61L 25/02*    (2006.01)
*B60L 13/06*    (2006.01)
*B61B 13/08*    (2006.01)

(52) U.S. Cl.
CPC ............. *B61L 25/026* (2013.01); *B60L 13/06* (2013.01); *B61B 13/08* (2013.01); *B60L 2200/26* (2013.01)

(58) Field of Classification Search
CPC ........ B60L 13/00; B60L 13/006; B60L 13/04; B60L 13/06; B60L 13/08; B60L 13/10;
(Continued)

(56) References Cited

U.S. PATENT DOCUMENTS

| 2010/0235090 A1* | 9/2010 | Borowy ................. B60L 13/06 104/284 |
| 2012/0019235 A1* | 1/2012 | Post ....................... B60L 13/06 324/207.13 |

(Continued)

FOREIGN PATENT DOCUMENTS

| CN | 101293528 A | * 10/2008 |
| CN | 106153088 A | 11/2016 |

(Continued)

OTHER PUBLICATIONS

Machine Translation by Espacenet of CN 101293528 A (Year: 2008).*

(Continued)

*Primary Examiner* — Angela Y Ortiz
*Assistant Examiner* — Aaron K McCullers
(74) *Attorney, Agent, or Firm* — Yue (Robert) Xu; Apex Attorneys at Law, LLP

(57) ABSTRACT

A positioning system and method for a maglev train, the positioning system comprising an onboard magnet mounted at the bottom of a train, two grating arrays laid on train tracks side by side in the traveling direction of the train, an optical pulse generation module and a data processing module. The data processing module performs first-stage train positioning according to drift conditions of the center wavelengths of the marking gratings, performs second-stage train positioning according to drift conditions of the center (Continued)

wavelengths of the first grating array, and performs third-stage train positioning according to drift conditions of the central wavelengths of the second grating array, so as to determine the track positions where the train arrives step by step.

9 Claims, 5 Drawing Sheets

(58) Field of Classification Search
CPC .... B60L 15/002; B60L 2200/26; B61B 13/08; B61B 25/02; B61B 25/025; B61B 25/026; E01B 25/30; H01F 7/0236; H02N 1/00; H02N 1/004
USPC ....... 701/19, 20; 104/130.02, 281, 282, 283, 104/284, 286
See application file for complete search history.

(56) References Cited

U.S. PATENT DOCUMENTS

| | | | | |
|---|---|---|---|---|
| 2019/0348898 | A1* | 11/2019 | Frangen | B65G 54/02 |
| 2020/0235649 | A1* | 7/2020 | Hayward | H02K 33/04 |
| 2022/0381991 | A1* | 12/2022 | Kuo | G02B 6/136 |

FOREIGN PATENT DOCUMENTS

| | | | |
|---|---|---|---|
| CN | 109813350 A | | 5/2019 |
| CN | 110758474 A | * | 2/2020 |
| CN | 110758475 A | | 2/2020 |
| CN | 111751570 A | | 10/2020 |
| CN | 113375702 A | | 9/2021 |
| CN | 114604296 A | | 6/2022 |
| EP | 1582430 A1 | | 5/2005 |
| JP | 2011211833 A | | 10/2011 |

OTHER PUBLICATIONS

Machine Translation of CN 110758474 A (Year: 2020).*
International Search Report for PCT/CN2022/121995 mailed Dec. 21, 2022, ISA/CN.
Tong Xinglin et al., Research progress on speed measurement and positioning technology of high- speed maglev train, Laser Journal, vol. 41,No. 3,2020.
Liu Yun et al., Research on the Novel Maglev Train Locating Method Based on Fiber Grating Pressure Sensor, Journal of the China Railway Society, vol. 27, No. 5, Oct. 2005.

* cited by examiner

POSITIONING SYSTEM AND METHOD FOR MAGLEV TRAIN

CROSS REFERENCE OF RELATED APPLICATION

This application is the national phase of International Application No. PCT/CN2022/121995, titled "POSITIONING SYSTEM AND METHOD FOR MAGLEV TRAIN", filed on Sep. 28, 2022, which claims priority to Chinese Patent Application No. 202210212795.7, titled "POSITIONING SYSTEM AND METHOD FOR MAGLEV TRAIN", filed on Mar. 4, 2022 with the China National Intellectual Property Administration, both of which are incorporated herein by reference in their entireties.

FIELD

The present disclosure relates to the field of maglev, and in particular to a system for positioning a maglev train and a method for positioning a maglev train.

BACKGROUND

The maglev trains are propelled by magnetic levitation force. The maglev train utilizes electromagnetic force for contactless levitation and guidance between the train and the track, and employs the electromagnetic force generated by the linear motor to propel the train. As the maglev trains are suspended in the air and are only subject to air resistance, they can travel at high speeds. High-speed maglev trains can reach speeds of more than 400 kilometers per hour, while most medium and low-speed maglev trains can reach speeds of 100-200 kilometers per hour. However, as maglev train speeds increase, the train positioning solutions in conventional technology can only roughly locate the position of the train, leading to low positioning accuracy.

Hence, how to provide a solution to the above technical problem is a problem for those skilled in the art to consider.

SUMMARY

An objective of the present disclosure is to provide a system and method for positioning a maglev train, in which the track position where the train has traveled is accurately located through a three-tier positioning, thereby providing a higher positioning accuracy.

To solve the above technical problems, a system for positioning a maglev train is provided according to the present disclosure, the system includes:

an on-board magnet arranged at a bottom of the train;
two grating arrays arranged in parallel on a train track in a traveling direction of the train, where each of the two grating arrays includes multiple sets of magnetic induction gratings; center wavelengths of the magnetic induction gratings in the same set within a first grating array of the two grating arrays are the same, and center wavelengths of the magnetic induction gratings in different sets within the first grating array are different; center wavelengths of the magnetic induction gratings in the same set within a second grating array of the two grating arrays are different, and center wavelengths of magnetic induction gratings at the same arrangement position in different sets within the second grating array are the same; a first magnetic induction grating of each set of magnetic induction gratings is configured as a marker grating; and only one magnetic induction grating in the same grating array is affected by the on-board magnet at the same time instant;

an optical pulse generation module, configured to provide an optical pulse signal to the two grating arrays;

a data processing module, configured to perform primary positioning of the train based on a center wavelength shift of the marker grating, perform secondary positioning of the train based on a center wavelength shift of the first grating array, and perform tertiary positioning of the train based on a center wavelength shift of the second grating array, to progressively locate a track location where the train has traveled.

In an embodiment, the optical pulse generation module includes:

a first swept light source, configured to send a first optical pulse signal after receiving a trigger signal;
a second swept light source, configured to send a second optical pulse signal after receiving the trigger signal;
a first optical pulse amplifier, configured to amplify the first optical pulse signal to obtain a first amplified optical pulse signal;
a second optical pulse amplifier, configured to amplify the second optical pulse signal to obtain a second amplified optical pulse signal;
a first circulator, configured to provide the first amplified optical pulse signal to the first grating array; and
a second circulator, configured to provide the second amplified optical pulse signal to the second grating array.

In an embodiment, the data processing module includes:
a first photoelectric converter, configured to receive a first to-be-detected optical signal returned by the first grating array from the first circulator, and convert the first to-be-detected optical signal into a first to-be-detected electrical signal;
a second photoelectric converter, configured to receive a second to-be-detected optical signal returned by the second grating array from the second circulator, and convert the second to-be-detected optical signal into a second to-be-detected electrical signal;
a data collector, configured to combine and encode the first to-be-detected electrical signal and the second to-be-detected electrical signal to obtain an electrical encoding signal; and
a data processor, configured to decode the electrical encoding signal to obtain the first to-be-detected electrical signal and the second to-be-detected electrical signal, and perform a three-tier positioning of the train based on the center wavelength shifts of the magnetic induction gratings indicated by the first to-be-detected electrical signal and the second to-be-detected electrical signal.

In an embodiment, the on-board magnet includes multiple sub-magnets; and the multiple sub-magnets are arranged in a Halbach array in the traveling direction of the train.

In an embodiment, a spacing between adjacent magnetic induction gratings in each grating array is equal to a first preset spacing threshold; a spacing between adjacent sub-magnets in the on-board magnet in traveling direction of the train is equal to a second preset spacing threshold, and a total length of the on-board magnet is equal to the first preset spacing threshold; and the data processing module is further configured to determine a distance that the train keeps on traveling from a current location of the train based on a center wavelength shift of a target grating after determining the target grating whose center wavelength is shifting within the second grating array and the current location based on a three-tier positioning of the train.

In an embodiment, the first grating array is a grating array in O-band; the second grating array is a grating array in C-band.

In an embodiment, the data processing module is further configured to:
obtain a first to-be-detected signal returned by the first grating array;
obtain a second to-be-detected signal returned by the second grating array;
determine that the train travels to a track segment where a new set of magnetic induction gratings is located, in a case that a signal indicating the center wavelength shift of the marker grating is detected in the second to-be-detected signal;
determine that the train travels to a track segment where a first set of magnetic induction gratings is located, in a case that a signal indicating the center wavelength shift of any one of magnetic induction gratings in the first set of magnetic induction gratings is detected in the first to-be-detected signal, where the first set of magnetic induction gratings is any set of magnetic induction gratings in the first grating array; and
determine that the train travels to a track location where a target grating is located, in a case that a signal indicating a center wavelength shift of the target grating in a second set of magnetic induction gratings in parallel with the first set of magnetic induction gratings is detected in the second to-be-detected signal, where the target grating is any one of magnetic induction gratings in the second set of magnetic induction gratings.

In an embodiment, the data processing module is further configured to determine a forward condition and a reverse condition of the train within a preset track distance based on the center wavelength shift of the second grating array.

In an embodiment, the data processing module is further configured to determine a real-time running speed of the train based on a real-time location change and a running time of the train.

In order to solve the above technical problems, a method for positioning a maglev trains is provided according to the present disclosure, which is applied to the system for positioning a maglev train according to any one of the above embodiments. The method includes:
performing the primary positioning of the train based on the center wavelength shift of the marker grating;
performing the secondary positioning of the train based on the center wavelength shift of the first grating array; and
performing the tertiary positioning of the train based on the center wavelength shift of the second grating array to progressively locate the track location where the train has traveled.

A system for positioning a maglev train is provided according to the present disclosure. The system includes an on-board magnet arranged at a bottom of the train; two grating arrays arranged in parallel on a train track in a traveling direction of the train, an optical pulse generation module and a data processing module. Where, center wavelengths of the magnetic induction gratings in the same set within a first grating array are the same, and center wavelengths of the magnetic induction gratings in different sets within the first grating array are different; center wavelengths of the magnetic induction gratings in the same set within a second grating array are different, and center wavelengths of magnetic induction gratings at the same arrangement position in different sets within the second grating array are the same; a first magnetic induction grating of each set of magnetic induction gratings is configured as a marker grating. The data processing module is configured to perform primary positioning of the train based on a center wavelength shift of the marker grating, perform secondary positioning of the train based on a center wavelength shift of the first grating array, and perform tertiary positioning of the train based on a center wavelength shift of the second grating array, to progressively locate a track location where the train has traveled. As a result, in the present disclosure, the track location where the train has traveled can be located accurately through the three-tier positioning, thereby achieving a higher positioning accuracy.

A method for positioning a maglev train is further provided according to the present disclosure, which has the same beneficial effect as the system for positioning a maglev train above.

BRIEF DESCRIPTION OF THE DRAWINGS

In order to illustrate technical solutions in embodiments of the present disclosure more clearly, drawings to be used in the description of the embodiments or the conventional technology are simply provided hereinafter. It is apparent that the drawings described below are only some embodiments of the present disclosure, and other drawings may be obtained by those skilled in the art based on the provided drawings without any creative effort.

DETAILED DESCRIPTION OF THE EMBODIMENTS

The essence of the present disclosure is to provide a system for positioning a maglev train and a method for positioning a maglev train, which can locate the track location where the train has traveled accurately through a three-tier positioning, thereby providing a higher positioning accuracy.

In order to make objectives, technical solutions and advantages of the present disclosure clearer, the technical solutions in the embodiments of the present disclosure are further described clearly and thoroughly with reference to the drawings in the embodiments of the present disclosure hereinafter. It is apparent that the described embodiments are only some, rather than all embodiments of the present disclosure. Any other embodiments obtained by those skilled in the art based on the embodiments of the present disclosure without any creative effort shall fall within the protection scope of the present disclosure.

Figure 1:
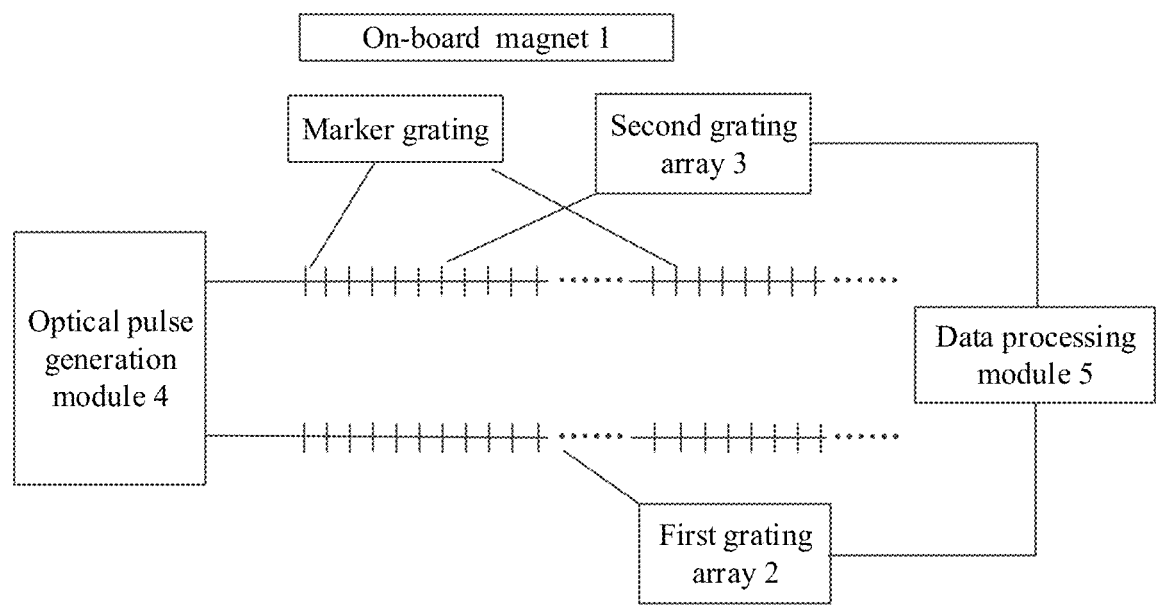
FIG. 1 is a schematic structural diagram of a system for positioning a maglev train according to an embodiment of the present disclosure.

Reference is made to FIG. 1. FIG. 1 is a schematic structural diagram of a system for positioning a maglev train according to an embodiment of the present disclosure.

The system for positioning a maglev train includes:
an on-board magnet 1 arranged at a bottom of a train;
two grating arrays arranged in parallel on a train track in a traveling direction of the train; where, the two grating arrays each contain multiple sets of magnetic induction gratings; center wavelengths of the magnetic induction gratings in a same set within a first grating array 2 are the same, and center wavelengths of the magnetic induction gratings in different sets within the first grating array 2 are different; center wavelengths of the magnetic induction gratings in a same set within a second grating array 3 are different, center wavelengths of gratings at a same arrangement position of the magnetic induction gratings in different sets within a second grating array 3 are the same, and a first magnetic induction grating of each set of magnetic induction gratings is provided as a marker grating; only one magnetic induction grating in a same grating array is affected by the on-board magnet 1 at the same time instant;
an optical pulse generation module 4, configured to provide an optical pulse signal to the two grating arrays respectively;
a data processing module 5, configured to perform primary positioning of the train based on a center wavelength shift of the marker grating, perform secondary positioning of the train based on the center wavelength shift of the first grating array 2, and perform tertiary positioning of the train based on the center wavelength shift of the second grating array 3, to step-by-step locate a track location where the train has traveled.

In an embodiment, the system for positioning a maglev train according to the present disclosure includes an on-board magnet 1, two grating arrays, an optical pulse generation module 4 and a data processing module 5, the working principle of the system is as follows.

The on-board magnet 1 is arranged at the bottom of the train. Two grating arrays are arranged in parallel on the train track in the travelling direction of the train. Both grating arrays include several sets of magnetic induction gratings (for example, 16 sets). Each set of magnetic induction gratings includes the same number of gratings. For example, each set of magnetic induction gratings includes 16 gratings. When the maglev train passes through the grating array, the magnetic induction grating in the grating array is affected by the on-board magnet 1, and the center wavelength of the optical signal returned by the magnetic induction grating shifts (this is because each grating is attached with a small magnetic bead and encapsulated through a sensitization structure; when the train travels, the on-board magnet 1 arranged under the maglev train body attracts the small magnetic bead to cause the grating to deform, thereby shifting the center wavelength of the grating). It should be noted that only one grating in the same grating array is affected by the on-board magnet 1 at the same time instant. Since the two grating arrays are arranged in parallel, the gratings of different grating arrays at the same arrangement position are affected by the on-board magnet 1 at the same time instant, for example, the N-th grating in the first grating array 2 and the N-th grating in the second grating array 3 are affected by the on-board magnet 1 at the same time instant.

In the two grating arrays, center wavelengths of the magnetic induction gratings in a same set within a first grating array 2 are the same, while center wavelengths of the magnetic induction gratings in different sets within the first grating array 2 are different. In an embodiment, multiple sets of magnetic induction gratings in the first grating array 2 may be arranged in order of increasing center wavelength gradually. The center wavelengths of each grating in the same set of magnetic induction gratings within the second grating array 3 are different (e.g., the gratings in the same set of magnetic induction gratings within the second grating array 3 may be arranged in order of increasing center wavelength gradually). The center wavelengths of the gratings in different sets of magnetic induction gratings at the same arrangement position are the same (e.g., the center wavelength of the M-th grating in the N-th set of magnetic induction gratings within the second grating array 3 is the same as the center wavelength of the M-th grating in the (N+1)-th set of magnetic induction gratings within the second grating array 3), and the first grating in each set of magnetic induction gratings within the second grating array 3 is configured as a marker grating. Where, other gratings in the grating array use gratings with a reflectivity below 2% other than the marker gratings, while marker gratings may use low-reflectivity gratings with a reflectivity of 5% to 10% to distinguish from grating arrays with a reflectivity below 2%, but without severely attenuating the optical signal.

The optical pulse generation module 4 provides optical pulse signals to the two grating arrays respectively, and each magnetic induction grating in the two grating arrays returns an optical signal indicating its own center wavelength shift to the data processing module 5. The data processing module 5 first performs the primary positioning of the train based on the center wavelength shift of the marker grating, then performs secondary positioning of the train based on the center wavelength shift of the first grating array 2, and finally performs tertiary positioning of the train based on the center wavelength shift of the second grating array 3, to progressively locate the track location where the train has traveled.

According to the present disclosure, the track location where the train has traveled can be accurately located through three-tier positioning, resulting in a high positioning accuracy.

Figure 2:
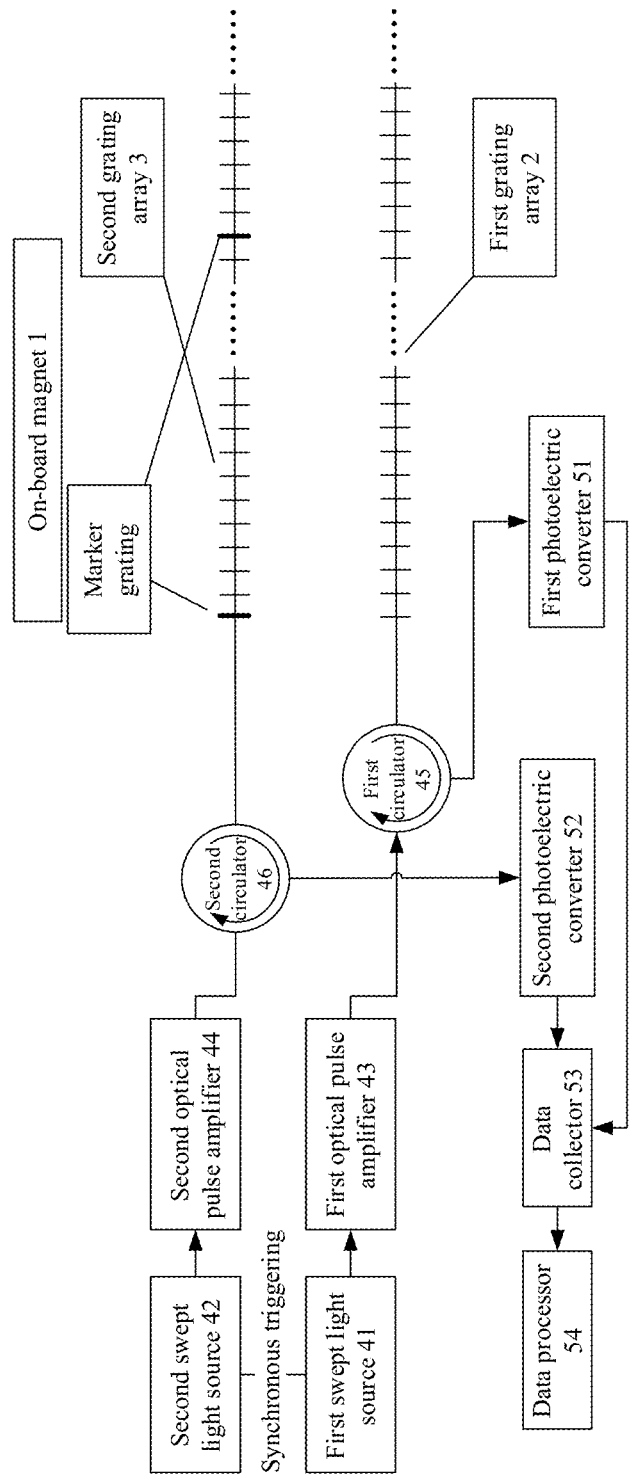
FIG. 2 is a specific structural schematic diagram of a system for positioning a maglev train according to an embodiment of the present disclosure.

Based on the above embodiment, reference is made to FIG. 2. FIG. 2 is a specific structural schematic diagram of a system for positioning a maglev train according to an embodiment of the present disclosure.

In an embodiment, the optical pulse generation module 4 includes:
a first swept light source 41, configured to send a first optical pulse signal after receiving a trigger signal;
a second swept light source 42, configured to send a second optical pulse signal after receiving the trigger signal;
a first optical pulse amplifier 43, configured to amplify the first optical pulse signal to obtain a first amplified optical pulse signal;
a second optical pulse amplifier 44, configured to amplify the second optical pulse signal to obtain a second amplified optical pulse signal;
a first circulator 45, configured to provide the first amplified optical pulse signal to the first grating array 2; and
a second circulator 46, configured to provide the second amplified optical pulse signal to the second grating array 3.

In an embodiment, the optical pulse generation module 4 according to the present disclosure includes a first swept light source 41, a second swept light source 42, a first optical pulse amplifier 43, a second optical pulse amplifier 44, a first circulator 45 and a second circulator 46, and the working principle is as follows.

The first swept light source 41 sends a first optical pulse signal to the first optical pulse amplifier 43 after receiving a trigger signal. The first optical pulse amplifier 43 amplifies the first optical pulse signal to obtain a first amplified optical pulse signal, and sends the first amplified optical pulse signal to the first circulator 45. The first circulator 45 provides the first amplified optical pulse signal to the first grating array 2.

The second swept light source 42 and the first swept light source 41 use the same trigger signal. The second swept light source 42 sends a second optical pulse signal to the second optical pulse amplifier 44 after receiving the trigger signal. The second optical pulse amplifier 44 amplifies the second optical pulse signal to obtain a second amplified optical pulse signal, and sends the second amplified optical pulse signal to the second circulator 46. The second circulator 46 provides the second amplified optical pulse signal to the second grating array 3.

In an embodiment, the spectral bandwidth of the two swept light sources may reach more than 40 nm, the wavelength scanning step is adjustable from 10 pm to 1 nm, the period and period interval during sweeping are adjustable from 1 us to 1 ms, with a minimum controllable pulse width of 1 us and a minimum pulse interval of 1 us.

In an embodiment, the data processing module 5 includes:
a first photoelectric converter 51, configured to receive a first to-be-detected optical signal returned by the first grating array 2 from the first circulator 45, and convert the first to-be-detected optical signal into a first to-be-detected electrical signal;
a second photoelectric converter 52, configured to receive a second to-be-detected optical signal returned by the second grating array 3 from the second circulator 46, and convert the second to-be-detected optical signal into a second to-be-detected electrical signal;
a data collector 53, configured to combine and encode the first to-be-detected electrical signal and the second to-be-detected electrical signal to obtain an electrical encoding signal; and
a data processor 54, configured to decode the electrical encoding signal to obtain the first to-be-detected electrical signal and the second to-be-detected electrical signal, and perform the three-tier positioning of the train based on the center wavelength shifts of the magnetic induction gratings indicated by the first to-be-detected electrical signal and the second to-be-detected electrical signal.

In an embodiment, the data processing module 5 according to the present disclosure includes a first photoelectric converter 51, a second photoelectric converter 52, a data collector 53 and a data processor 54, and the working principle is as follows.

The first circulator 45 further receives a first to-be-detected optical signal returned by the first grating array 2 and sends the first to-be-detected optical signal to the first photoelectric converter 51. The first photoelectric converter 51 converts the first to-be-detected optical signal into a first to-be-detected electrical signal, and sends the first to-be-detected electrical signal to the data collector 53.

The second circulator 46 further receives a second to-be-detected optical signal returned by the second grating array 3 and sends the second to-be-detected optical signal to the second photoelectric converter 52. The second photoelectric converter 52 converts the second to-be-detected optical signal into a second to-be-detected electrical signal, and sends the second to-be-detected electrical signal to the data collector 53.

The data collector 53 combines and encodes the first to-be-detected electrical signal and the second to-be-detected electrical signal (e.g., they can be combined and encoded by using a subscript-superscript combination encoding form, such as using the first to-be-detected electrical signal corresponding to the N-th grating in the first grating array 2 as a superscript for a data point, and using the second to-be-detected electrical signal corresponding to the N-th grating in the second grating array 3 as a subscript for the same data point) to obtain the electrical encoding signal, and the electrical encoding signal is sent to data processor 54. The data processor 54 decodes the electrical encoding signal to obtain the first to-be-detected electrical signal and the second to-be-detected electrical signal, and performs the three-tier positioning of the train based on the center wavelength shifts of the gratings indicated by the decoded first to-be-detected electrical signal and the second to-be-detected electrical signal.

In an embodiment, each of the two photoelectric converters have a −3 db bandwidth of DC-500 MHz, a rise time of 0.55 ns, a gain of 18×103V/W, a saturation optical power of 100 uW, and a responsivity of 0.9 A/W, enabling high-precision photoelectric conversion. The data collector can collect up to 4 channels, each channel with a sampling rate of 500 Ms/s and a sampling precision of 16 bits, allowing for high-precision data collection.

In an embodiment, the on-board magnet 1 includes multiple sub-magnets; where the multiple sub-magnets are arranged in a Halbach array in the traveling direction of the train.

In an embodiment, the on-board magnet 1 provided in the present disclosure includes multiple sub-magnets, which are arranged in a Halbach array in the traveling direction of the train to enhance the magnetic force and the sensitivity of the system.

Figure 3:
FIG. 3 is a schematic diagram of an arrangement of a Halbach array according to an embodiment of the present disclosure.
Figure 4:
FIG. 4 is a schematic diagram of an extended arrangement of a Halbach array according to an embodiment of the present disclosure.

As shown in FIG. 3, which is one arrangement of a Halbach array (the arrows in the figure represent the direction of the magnetic field), which can increase the magnetic field intensity without reducing the accuracy; as shown in FIG. 4, which illustrates one extended arrangement of a Halbach array, which compromises some accuracy to further increase the magnetic field intensity, making this system suitable for a wider range of practical environments.

In an embodiment, a spacing between adjacent magnetic induction gratings in each grating array is equal to a first preset spacing threshold; a spacing between adjacent sub-magnets in the on-board magnet 1 in the traveling direction of the train is equal to a second preset spacing threshold, and a total length of the on-board magnet 1 is equal to the first preset spacing threshold;

The data processing module 5 is further configured to determine a distance that the train keeps on traveling from a current location of the train based on a center wavelength shift of a target grating after determining the target grating whose center wavelength is shifting within the second grating array 3 and the current location of the train based on the three-tier positioning of the train.

In an embodiment of the present disclosure, the spacing between adjacent gratings in each grating array is equal to the first preset spacing threshold, i.e., the gratings in each grating array are evenly arranged. In the travelling direction of the train, spacing between adjacent sub-magnets in the on-board magnet 1 is equal to the second preset spacing threshold, and the total length of the on-board magnet 1 is equal to the first preset spacing threshold, which can ensure that only one grating in the same grating array is affected by the on-board magnet at the same time instant.

Based on this, the data processing module 5 may further determine a distance that the train keeps on traveling from the current location of the train based on a center wavelength shift of a target grating after determining a grating (referred to as the target grating) whose center wavelength is shifting within the second grating array 3 and the current location of the train based on the three-tier positioning of the train.

In an embodiment, the first grating array 2 is a grating array in O-band; the second grating array 3 is a grating array in C-band.

In an embodiment of the present disclosure, the first grating array 2 is a grating array in O-band, the center wavelength of the grating of the grating array in O-band is 1280-1310 nm, and 16 gratings are included in one set. And, the second grating array 3 is a grating array in C-band, the center wavelength of the grating of the grating array in C-band is 1532-1560 nm, and 16 gratings are included in one set. The grating array is a weak grating array and can be arranged over long distances.

Figure 5:
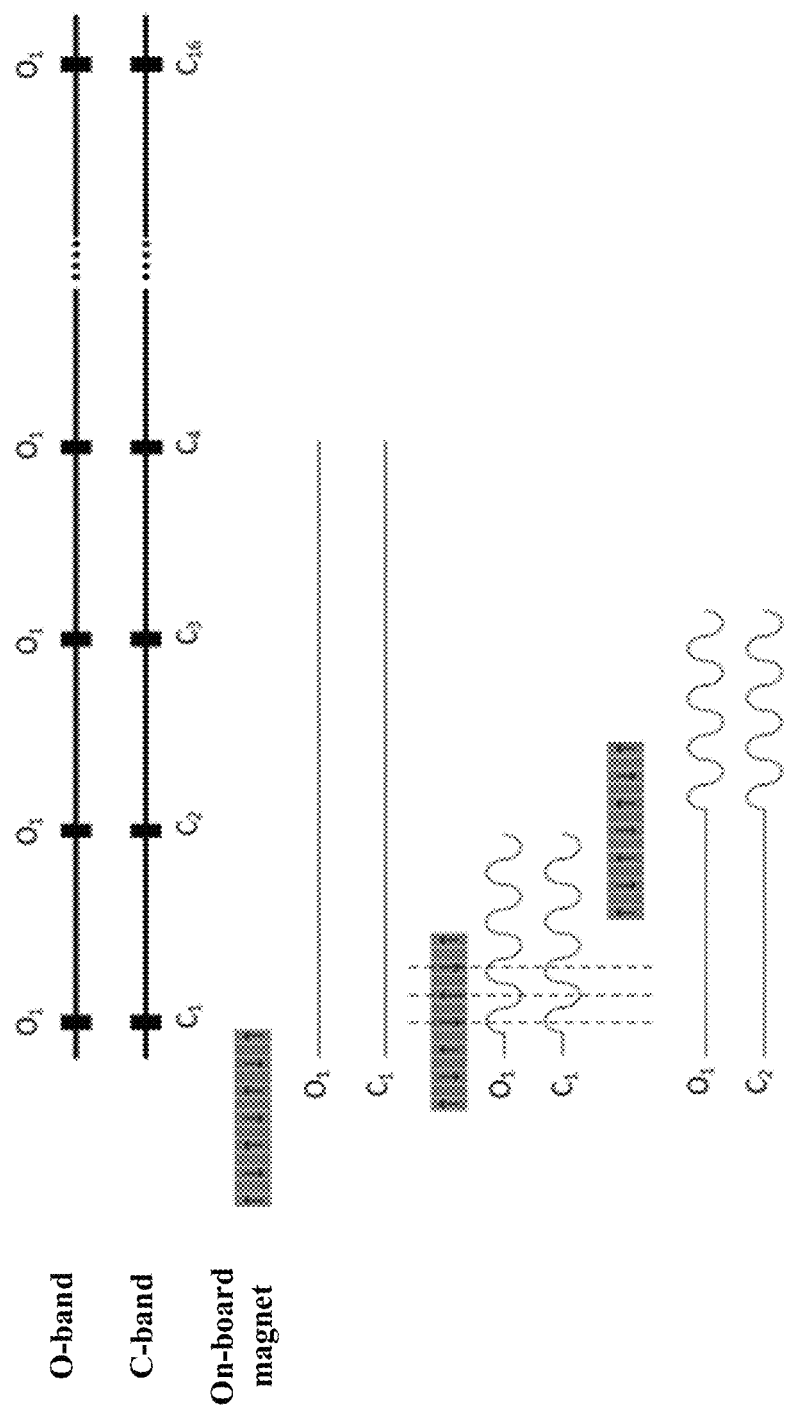
FIG. 5 is a schematic diagram of magnetic induction of two grating arrays according to an embodiment of the present disclosure.

As shown in FIG. 5, it provides a set of magnetic induction gratings in the first grating array 2 and a set of magnetic induction gratings in the second grating array 3 (the principles of the remaining sets of magnetic induction gratings are the same and will not be repeated in the present disclosure). Since the center wavelengths of the same set of magnetic induction gratings in the first grating array 2 are the same, the set of magnetic induction gratings in the first grating array 2 in FIG. 5 is represented by $O_1$. Since center wavelengths of the same set of magnetic induction gratings in the second grating array 3 are different, the set of magnetic induction gratings in the second grating array 3 in FIG. 5 are represented as $C_1$ to $C_{16}$ respectively (a sample of combination encoding method: $O_1\_C_1$).

As shown in FIG. 5, a simple sub-magnet arrangement of the vehicle-mounted magnet 1 is further provided, where shows only two magnetic field directions. When no on-board magnet 1 passes the magnetic induction grating, the center wavelength of the magnetic induction grating does not change. When any one of sub-magnets in the on-board magnet 1 passes the magnetic induction grating, the center wavelength of the magnetic induction grating is affected accordingly (as the sinusoidal change shown in FIG. 5). Based on this, after determining a target grating whose center wavelength is shifting in the second grating array 3 and a current location (i.e., the on-board magnet of the train travels on the track location where the target grating is located) of the train based on the three-tier positioning of the train, the data processing module 5 may further determine the distance that the train keeps on traveling from the current location of the train based on the number of crests and troughs of the center wavelength of the target grating. Since the distance between adjacent crest and trough=the spacing between adjacent sub-magnets of on-board magnet=the second preset spacing threshold, when N crests and troughs appear again in the center wavelength of the target grating, the distance that the train keeps on traveling=N*second preset spacing threshold.

In an embodiment, the data processing module 5 is further configured to:
  obtain the first to-be-detected signal returned by the first grating array;
  obtain the second to-be-detected signal returned by the second grating array;
  determine that the train travels to a track segment where a new set of magnetic induction gratings is located, in a case that a signal indicating the center wavelength shift of the marker grating is detected in the second to-be-detected signal;
  determine that the train travels to a track segment where a first set of magnetic induction gratings is located, in a case that a signal indicating the center wavelength shift of any grating in the first set of magnetic induction gratings is detected in the first to-be-detected signal, where the first set of magnetic induction gratings is any set of magnetic induction gratings in the first grating array; and
  determine that the train travels to a track location where a target grating is located, in a case that a signal indicating the center wavelength shift of the target grating in a second set of magnetic induction gratings in parallel with the first set of magnetic induction gratings is detected in the second to-be-detected signal, where the target grating is any grating in the second set of magnetic induction gratings.

In an embodiment of the present disclosure, the process of the three-tier positioning of the train performed by the data processing module 5 includes as follows: 1) obtaining the first to-be-detected signal returned by the first grating array; obtaining the second to-be-detected signal returned by the second grating array; 2) determine that the train travels to a track segment where a new set of magnetic induction gratings is located, in a case that a signal indicating the center wavelength shift of the marker grating is detected in the second to-be-detected signal (since the center wavelengths of the marker gratings in different sets of magnetic induction gratings within the second grating array are the same, the center wavelength shifts of the marker gratings in different sets of magnetic induction gratings are the same when encountering the on-board magnet. In this case, when a signal indicating the center wavelength shift of the marker grating is detected in the second to-be-detected signal, it is unable to determine the marker grating of which set of magnetic induction gratings is encountered the on-board magnet, it can only determine that the train has traveled to the track segment where the new set of magnetic induction gratings is located by arranging the marker grating as a first grating of each set of magnetic induction gratings); 3) determining that the train travels to a track segment where a first set of magnetic induction gratings is located, in a case that a signal indicating the center wavelength shift of any grating of any set of magnetic induction gratings (referred to as the first set of magnetic induction gratings) in the first grating array is detected in the first to-be-detected signal (since the center wavelengths of the same set of magnetic induction gratings in the first grating array are the same, the center wavelength shifts of gratings in the first set of magnetic induction gratings are the same when encountering the on-board magnet. In this case, when a signal indicating the center wavelength shift of any grating in the first set of magnetic induction gratings is detected in the first to-be-detected signal, it is unable to determine which grating in the first set of magnetic induction gratings encountered the on-board magnet, it can only determine that the train has traveled to the track segment where the first set of magnetic induction gratings is located); 4) determining that the train travels to a track location where a target grating is located, in a case that a signal indicating the center wavelength shift of any grating (referred to as the target grating) in a second set of magnetic induction gratings in parallel with the first set of magnetic induction gratings is detected in the second to-be-detected signal (since the center wavelengths of the same set of magnetic induction gratings in the second grating array are different, the center wavelength shifts of gratings of the same set of magnetic induction gratings are different when encounter the on-board magnet. In this case, when the signal indicating the center wavelength shift of the target grating in the second set of magnetic induction gratings is detected in the second to-be-detected signal, it is determined that the target grating in the second set of magnetic induction gratings encountered the on-board magnet, i.e., it is determined that the on-board magnet of the train has traveled to the track location where the target grating is located).

In addition, in the present disclosure, the data processing module 5 may further correct the current location of the train obtained by the three-tier positioning of the maglev train through calculating the speed and the conventional delay of data transmission processing to obtain more accurate positioning of the train.

In an embodiment, the data processing module 5 is further configured to:
determine a forward condition and a reverse condition of the train within a preset track distance based on the center wavelength shift of the second grating array.

Furthermore, since the center wavelengths of the same set of magnetic induction gratings in the second grating array are different, when the train is moving forward or backward, the center wavelengths of the same set of magnetic induction gratings in the second grating array changes differently, the data processing module 5 provided in the present disclosure may further determine the forward condition and reverse condition of the train within a short distance based on the center wavelength shift of the second grating array (forward: forward traveling direction; reverse: reverse traveling direction).

In an embodiment, the data processing module 5 is further configured to:
determine a real-time running speed of the train based on a real-time location change and a running time of the train.

Furthermore, the data processing module 5 in the present disclosure may further configured to obtain the real-time location change of the train based on the track location where the train has traveled obtained by the real-time positioning, and determine the real-time running speed of the train based on the real-time location change and the running time of the train.

Based on the description above, during the traveling of the maglev train, the position, speed, traveling direction and the like of the maglev train can be obtained through the primary confirmation of the marker grating, the secondary confirmation of the wave in O-band with the same wavelength range in the same set, and the tertiary confirmation of the wave in C-band with different wavelengths in the same set. This system has the advantages of robust environmental adaptability, high sensitivity, high measurement accuracy, anti-interference and long service life.

Figure 6:
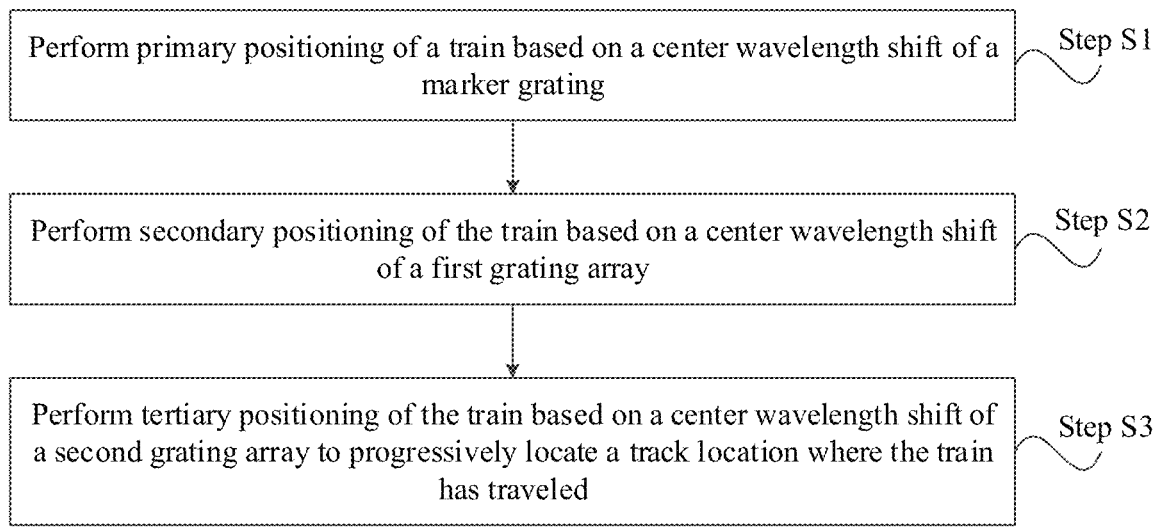
FIG. 6 is a flowchart of a method for positioning a maglev train according to an embodiment of the present disclosure.

Reference is made to FIG. 6. FIG. 6 is a flowchart of a method for positioning a maglev train according to an embodiment of the present disclosure.

The method for positioning a maglev train may be applied to any one of embodiments of the system for positioning a maglev train above. The method includes step S1 to step S3 as follows.

In step S1, primary positioning of a train is performed based on a center wavelength shift of a marker grating.

In step S2, secondary positioning of the train is performed based on a center wavelength shift of a first grating array.

In step S3, tertiary positioning of the train is performed based on a center wavelength shift of a second grating array, to progressively a track location where the train has traveled.

The method for positioning a maglev train provided according to the present disclosure can be referred to the above embodiments of the system for positioning a maglev train, which will not be repeated here.

It should be further noted that in the present disclosure, the relationship terminologies such as "first" and "second" are only used herein to distinguish one entity or operation from another entity or operation, rather than to necessitate or imply that the actual relationship or order exists between the entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "comprising/including a(n) . . . " does not exclude existence of another identical element in such process, method, article or device.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Therefore, the present disclosure is not be limited to the embodiments described herein, but should be in accordance with the broadest scope consistent with the principle and novel features disclosed herein.

The invention claimed is:

1. A system for positioning a maglev train, comprising:
an on-board magnet arranged at a bottom of the train;
two grating arrays arranged in parallel on a train track in a traveling direction of the train, wherein each of the two grating arrays comprises a plurality of sets of magnetic induction gratings;
center wavelengths of the magnetic induction gratings in the same set within a first grating array of the two grating arrays are the same, and center wavelengths of the magnetic induction gratings in different sets within the first grating array are different;
center wavelengths of the magnetic induction gratings in the same set within a second grating array of the two grating arrays are different, and center wavelengths of magnetic induction gratings at the same arrangement position in different sets within the second grating array are the same;
a first magnetic induction grating of each set of magnetic induction gratings is configured as a marker grating; and
only one magnetic induction grating in the same grating array is affected by the on-board magnet at the same time instant;
an optical pulse generation module, configured to provide an optical pulse signal to the two grating arrays;
a data processing module, configured to perform primary positioning of the train based on a center wavelength shift of the marker grating, perform secondary positioning of the train based on a center wavelength shift of the first grating array, and perform tertiary positioning of the train based on a center wavelength shift of the second grating array, to progressively locate a track location where the train has traveled; and wherein the data processing module is further configured to:

obtain a first to-be-detected signal returned by the first grating array;

obtain a second to-be-detected signal returned by the second grating array;

determine that the train travels to a track segment where a new set of magnetic induction gratings is located, when a signal indicating the center wavelength shift of the marker grating is detected in the second to-be-detected signal;

determine that the train travels to a track segment where a first set of magnetic induction gratings is located, when a signal indicating the center wavelength shift of any one of magnetic induction gratings in the first set of magnetic induction gratings is detected in the first to-be-detected signal, wherein the first set of magnetic induction gratings is any set of magnetic induction gratings in the first grating array; and determine that the train travels to a track location where a target grating is located, when a signal indicating a center wavelength shift of the target grating in a second set of magnetic induction gratings in parallel with the first set of magnetic induction gratings is detected in the second to-be-detected signal, wherein the target grating is any one of magnetic induction gratings in the second set of magnetic induction gratings.

2. The system for positioning the maglev train according to claim 1, wherein the optical pulse generation module comprises:

a first swept light source, configured to send a first optical pulse signal after receiving a trigger signal;

a second swept light source, configured to send a second optical pulse signal after receiving the trigger signal;

a first optical pulse amplifier, configured to amplify the first optical pulse signal to obtain a first amplified optical pulse signal;

a second optical pulse amplifier, configured to amplify the second optical pulse signal to obtain a second amplified optical pulse signal;

a first circulator, configured to provide the first amplified optical pulse signal to the first grating array; and a second circulator, configured to provide the second amplified optical pulse signal to the second grating array.

3. The system for positioning the maglev train according to claim 2, wherein the data processing module comprises:

a first photoelectric converter, configured to receive a first to-be-detected optical signal returned by the first grating array from the first circulator, and convert the first to-be-detected optical signal into a first to-be-detected electrical signal;

a second photoelectric converter, configured to receive a second to-be-detected optical signal returned by the second grating array from the second circulator, and convert the second to-be-detected optical signal into a second to-be-detected electrical signal;

a data collector, configured to combine and encode the first to-be-detected electrical signal and the second to-be-detected electrical signal to obtain an electrical encoding signal; and a data processor, configured to decode the electrical encoding signal to obtain the first to-be-detected electrical signal and the second to-be-detected electrical signal, and perform a three-tier positioning of the train based on the center wavelength shifts of the magnetic induction gratings indicated by the first to-be-detected electrical signal and the second to-be-detected electrical signal.

4. The system for positioning the maglev train according to claim 1, wherein the on-board magnet comprises a plurality of sub-magnets, and the plurality of sub-magnets are arranged in a Halbach array in the traveling direction of the train.

5. The system for positioning the maglev train according to claim 4, wherein a spacing between adjacent magnetic induction gratings in each grating array is equal to a first preset spacing threshold; a spacing between adjacent sub-magnets in the on-board magnet in traveling direction of the train is equal to a second preset spacing threshold, and a total length of the on-board magnet is equal to the first preset spacing threshold; and the data processing module is further configured to determine a distance that the train keeps on traveling from a current location of the train based on a center wavelength shift of a target grating after determining the target grating whose center wavelength is shifting within the second grating array and the current location based on a three-tier positioning of the train.

6. The system for positioning the maglev train according to claim 1, wherein the first grating array is a grating array in O-band; the second grating array is a grating array in C-band.

7. The system for positioning the maglev train according to claim 1, wherein the data processing module is further configured to:

determine a forward condition and a reverse condition of the train within a preset track distance based on the center wavelength shift of the second grating array.

8. The system for positioning the maglev train according to claim 1, wherein the data processing module is further configured to:

determine a real-time running speed of the train based on a real-time location change and a running time of the train.

9. A method for positioning a maglev train, applied to a system for positioning the maglev train, wherein the system comprises:

an on-board magnet arranged at a bottom of the train;

two grating arrays arranged in parallel on a train track in a traveling direction of the train, wherein each of the two grating arrays comprises a plurality of sets of magnetic induction gratings;

center wavelengths of the magnetic induction gratings in the same set within a first grating array of the two grating arrays are the same, and center wavelengths of the magnetic induction gratings in different sets within the first grating array are different;

center wavelengths of the magnetic induction gratings in the same set within a second grating array of the two grating arrays are different, and center wavelengths of magnetic induction gratings at the same arrangement position in different sets within the second grating array are the same; a first magnetic induction grating of each set of magnetic induction gratings is configured as a marker grating; and only one magnetic induction grating in the same grating array is affected by the on-board magnet at the same time instant;

an optical pulse generation module, configured to provide an optical pulse signal to the two grating arrays;

a data processing module, configured to perform primary positioning of the train based on a center wavelength shift of the marker grating, perform secondary positioning of the train based on a center wavelength shift of the first grating array, and perform tertiary positioning of the train based on a center wavelength shift of the second grating array, to progressively locate a track location where the train has traveled;

the method comprises:

performing the primary positioning of the train based on the center wavelength shift of the marker grating;

performing the secondary positioning of the train based on the center wavelength shift of the first grating array;

performing the tertiary positioning of the train based on the center wavelength shift of the second grating array to progressively locate the track location where the train has traveled; and wherein the data processing module is further configured to:

obtain a first to-be-detected signal returned by the first grating array;

obtain a second to-be-detected signal returned by the second grating array;

determine that the train travels to a track segment where a new set of magnetic induction gratings is located, when a signal indicating the center wavelength shift of the marker grating is detected in the second to-be-detected signal;

determine that the train travels to a track segment where a first set of magnetic induction gratings is located, when a signal indicating the center wavelength shift of any one of magnetic induction gratings in the first set of magnetic induction gratings is detected in the first to-be-detected signal, wherein the first set of magnetic induction gratings is any set of magnetic induction gratings in the first grating array; and determine that the train travels to a track location where a target grating is located, when a signal indicating a center wavelength shift of the target grating in a second set of magnetic induction gratings in parallel with the first set of magnetic induction gratings is detected in the second to-be-detected signal, wherein the target grating is any one of magnetic induction gratings in the second set of magnetic induction gratings.

* * * * *